United States Patent [19]

Platteter et al.

[11] Patent Number: 5,027,396
[45] Date of Patent: Jun. 25, 1991

[54] EXECUTION PROTECTION FOR FLOPPY DISKS

[75] Inventors: Dale T. Platteter, Fairport; Robert S. Westfall, Rochester; Jeff C. Carter, Fairport, all of N.Y.

[73] Assignee: Xerox Corporation, Stamford, Conn.

[21] Appl. No.: 520,332

[22] Filed: May 7, 1990

[51] Int. Cl.$^5$ .............................................. H04L 9/00
[52] U.S. Cl. .......................................... 380/4; 380/3; 360/60
[58] Field of Search .......................... 380/3, 4; 360/60

[56] References Cited

U.S. PATENT DOCUMENTS

| | | |
|---|---|---|
| 4,462,078 | 7/1984 | Ross . |
| 4,577,289 | 3/1986 | Comerford et al. .............. 364/900 |
| 4,584,641 | 4/1986 | Guglielmino ...................... 364/200 |
| 4,734,796 | 3/1988 | Grynberg ............................. 360/60 |
| 4,785,361 | 11/1988 | Brathy ................................. 360/60 |
| 4,849,836 | 7/1989 | Kachikian ............................ 360/60 |

OTHER PUBLICATIONS

Voelcker et al., 'How Disks Are Padlocked', IEEE Spectrum, V23, N6, 6/86, pp. 32-40.

Primary Examiner—Thomas H. Tarcza
Assistant Examiner—David Cain
Attorney, Agent, or Firm—Ronald F. Chapuran

[57] ABSTRACT

The method of permitting the execution of a disk loaded into the disk drive, the disk having a plurality of tracks, comprising the steps of writing data in non-standard format and length to a normally unaccessible track of the disk, the data including an encrypted password, the password being located at an arbitary location within the data, reading the data resulting in an error signal, locating an indexing position and applying an offset to identify the password, and unencrypting and authenticating the password in order to execute the disk.

14 Claims, 6 Drawing Sheets

CREATING A KEYDISK FLOPPY

VERIFYING A KEYDISK

EXECUTION PROTECTION FOR FLOPPY DISKS

BACKGROUND OF THE INVENTION

The invention relates to a system for controlling a reproduction machine, and more particularly, to a method for inhibiting the execution of a floppy disk loaded into the control of such machine.

As reproduction machines such as copiers and printers become more complex and versatile in features and capability, the machine software control permits the storage and manipulation of sensitive customer information and proprietary machine data as well as the communication with off site facilities. The security of this type of information becomes a prime consideration including the prevention of the copying of control disks that are loaded into the machine, and even more importantly, to the prevention of the use and execution of various utility disks that are loaded into the machine.

PRIOR ART

The prior art is replete with methods of system and program security. For example, U.S. Pat. No. 4,577,289 to Comford et al. discloses a hardware key-on disk system for copy-protecting magnetic storage media wherein an area of a disk is altered so it is different from other areas. See column 2, line 63—column 3, line 8 and column 3, lines 16–24. A method to detect copies which do not have a unwritable sector is provided. See column 3, lines 47–59. A software package to test a code and run a program if that code is shown correct. See column 3, line 60—column 4, line 7. This technique is applicable for hard and floppy disks. See column 4, lines 22–23. A method to place non-magnetic codes on a floppy disk during manufacture is provided. See column 4, line 62—column 5, line 8. A method to produce codes on already made disks is also disclosed.

U.S. Pat. No. 4,462,078 to Ross discloses a computer program protection method wherein an area of a disk is made unwritable. See column 1, line 59—column 2, line 10. A stepwise method to prevent copying is shown. See column 2, lines 11–50.

U.S. Pat. No. 4,584,641 to Guglielmino discloses a copyprotecting system for software protection wherein a system can be used for any type of disk including floppy and hard disks. The system removes some of the magnetic media from a disk. See column 2, lines 33–41. This makes a sector unusable. A software routine checks a disk and erases it if no permanent I/O error is found. See column 3, line 55—column 4, line 25.

U.S. Pat. No. 4,734,796 to Grynberg et al. discloses a technique for preventing unauthorized copying of information recorded on a recording medium and a protected recording medium wherein a disk is physically altered to create a read only area. See column 3, lines 26–42. A method of using a variable signature is also shown. See column 4, lines 24–68.

U.S. Pat. No. 4,785,361 to Brotby discloses a method and apparatus for frustrating the unauthorized copying of recorded data wherein a read head at a factory writes a fingerprint, but a standard disk drive can not write over it. See column 4, lines 18–61.

U.S. Pat. No. 4,849,836 to Kachikian discloses a copy protection for computer disks wherein a code work is shifted as time goes by. See column 3, lines 30–45. An initial code is provided to let the computer know where a key code is. See column 3, lines 21–29. A method to overlap several tracks with a code is shown. See column 4, lines 31–45. A method to check a valid disk is disclosed.

In essence, however, these prior art methods are directed at making a disk unique by creating a physical signature about the disk which can not be copied, but the disk can be accessed by normal methods on normal systems and can be verified. This is a major disadvantage. For example, U.S. Pat. No. 4,849,836—"Copy Protection for Computer Discs", discusses a method for protecting a disk by encoding information on the disk which when read back multiple times is intended to vary in a known and predetermined pattern. This method is known as ambiguous or weak bit encoding. The general scheme being that these special data areas will change on the original disk, but will not change on a copy of the disk.

U.S. Pat. No. 4,785,361—"A Method and Apparatus for Frustrating the Unauthorized copying of recorded data", involves creating a physical 'signature' on the floppy disk, and encoding the information about the 'signature' into the software on the disk in a way that the software on the disk can not be executed without running the 'signature' check software. This patent proposes that the 'signature' can be a result of intentionally inflicted damage to the diskette recording surface, or that special media be used with can not be over-written, or that some hardware be incorporated into the disk jacket to update some information on the disk everytime it is used.

U.S. Pat. No. 4,734,796—"Technique for preventing unauthorized copying of information recorded on a recording medium and a protected recording medium", also deals with copy protection by making the original disk unique and embedded software to check to see if the 'uniqueness' of the disk is still intact, ie the original disk.

U.S. Pat. No. 4,584,641—"Copyprotecting system for Software Protection" is virtually identical to the prior two patents in that it suggests adding one or more permanent defects into the disk, recording information about the defects onto the disk, and then providing software which can check the actual defects against the expected defects.

U.S. Pat. No. 4,577,289—"Hardware Key-On-Disk system for copy-protecting magnetic storage media", suggests that copy protection can be provided by making special disks with special media, thereby creating again, a physical signature which could not be copied. It proposes a couple of methods for making the signature.

It would be desirable, therefore, to be able to protect a disk from being copied, but in a manner that it does not absolutely protect the floppy. Rather, it would be desirable to make it difficult to copy a disk with conventional hardware and software which is ready available on the market. The prior art deals with the absolute protection of floppy disks themselves which can not only be more complex, but also does not necessarily prevent accession and verification.

It is an object of the present invention, therefore, to provide a new and improved technique to make system disks unusable. It is another object of the present invention to allow copy-protection in selected systems and capable of being verified only with with special hardware. It is an object of the present invention to protect against disks being copied using standard IBM compatible PC's. It is still another object of the present invention to provide access to original keyed disks that is limited and restricted because un-authorized copies can be easily traced.

SUMMARY OF THE INVENTION

Briefly, the present invention is concerned with the method of permitting the execution of a disk loaded into the disk drive, the disk having a plurality of tracks, comprising the steps of writing data in non-standard format and length to a normally unaccessible track of the disk, the data including an encrypted password, the password being located at an arbitrary location within the data, reading the data resulting in an error signal, locating an indexing position and applying an offset to identify the password, and unencrypting and authenticating the password in order to execute the disk.

For a better understanding of the present invention, reference may be had to the accompanying drawings wherein the same reference numerals have been applied to like parts and wherein:

DETAILED DESCRIPTION OF THE DRAWINGS

DETAILED DESCRIPTION OF THE PREFERRED EMBODIMENT

Figure 1:
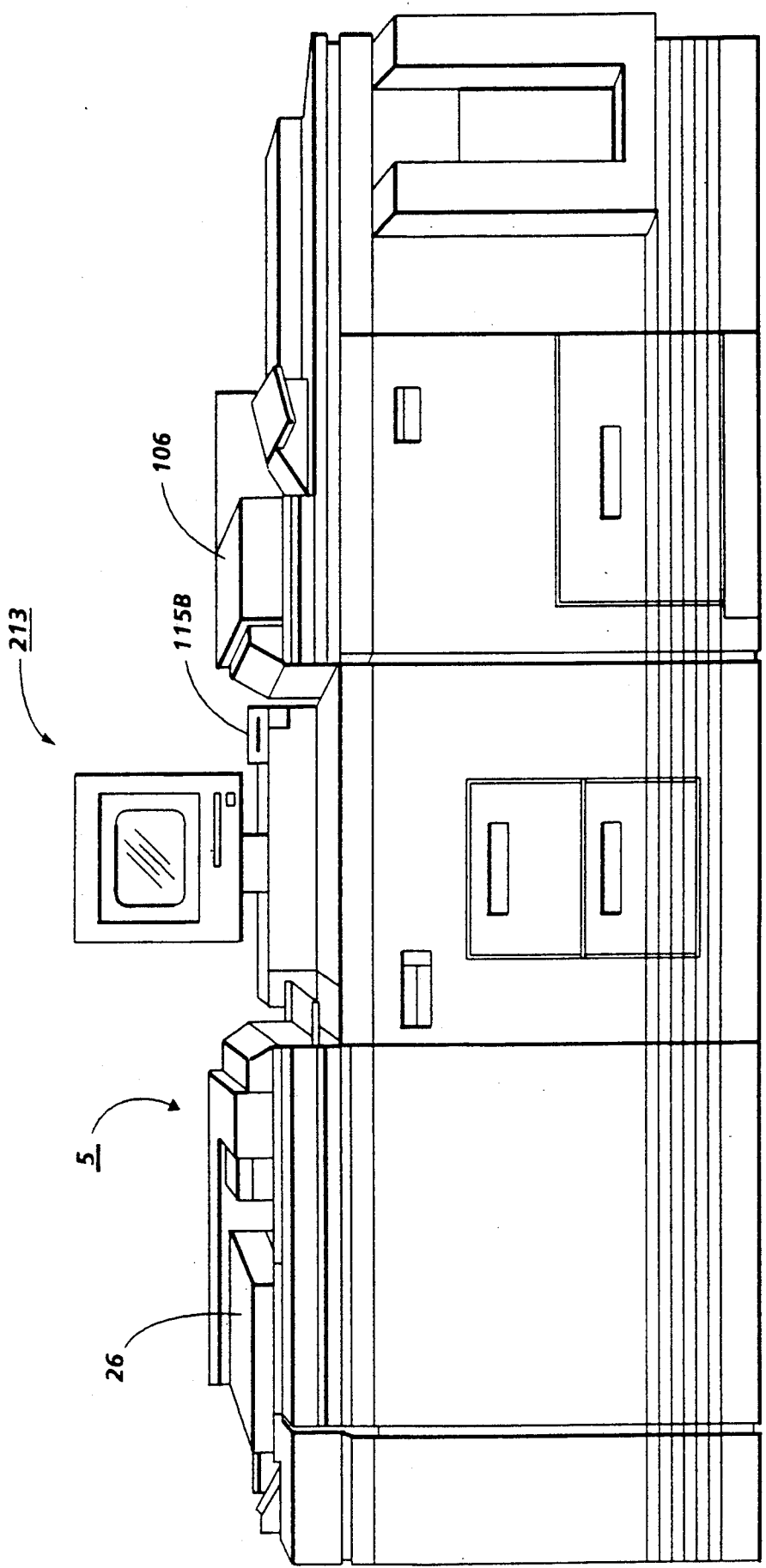
FIG. 1 is an isometric view of an illustrative reproduction machine incorporating the present invention.
Figure 2:
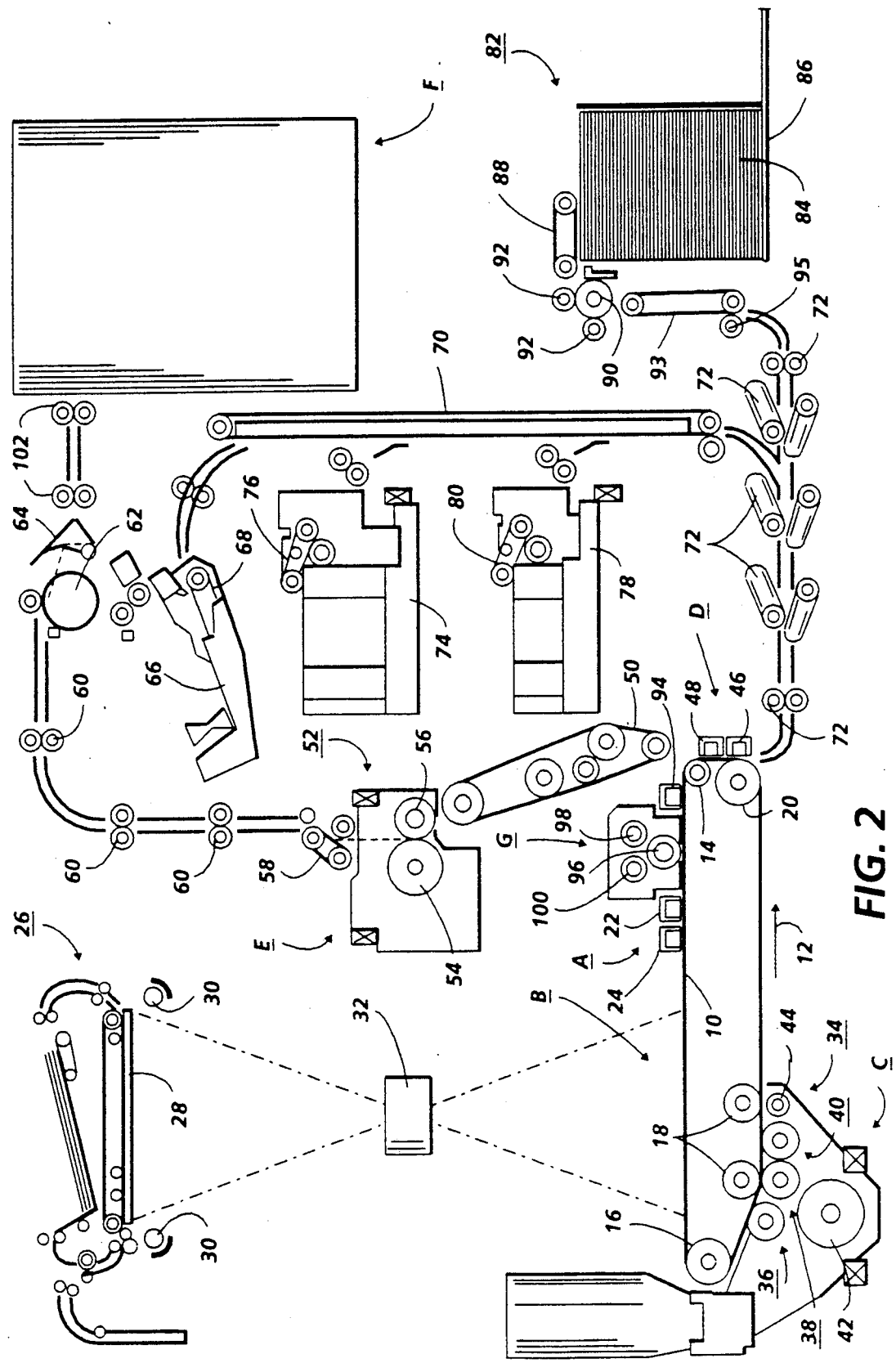
FIG. 2 is a schematic elevational view depicting various operating components and subsystems of the machine shown in FIG. 1.

For a general understanding of the features of the present invention, reference is made to the drawings. Referring to FIGS. 1 and 2, there is shown an electrophotographic reproduction machine 5 composed of a plurality of programmable components and subsystems which cooperate to carry out the copying or printing job programmed through a touch dialogue User Interface (U.I.).

Machine 5 employs a photoconductive belt 10. Belt 10 is entrained about stripping roller 14, tensioning roller 16, idler rollers 18, and drive roller 20. Drive roller 20 is rotated by a motor coupled thereto by suitable means such as a belt drive. As roller 20 rotates, it advances belt 10 in the direction of arrow 12 through the various processing stations disposed about the path of movement thereof.

Initially, the photoconductive surface of belt 10 passes through charging station A where two corona generating devices, indicated generally by the reference numerals 22 and 24 charge photoconductive belt 10 to a relatively high, substantially uniform potential. Next, the charged photoconductive belt is advanced through imaging station B. At imaging station B, a document handling unit 26 sequentially feeds documents from a stack of documents in a document stacking and holding tray into registered position on platen 28. A pair of Xenon flash lamps 30 mounted in the optics cavity illuminate the document on platen 28, the light rays reflected from the document being focused by lens 32 onto belt 10 to expose and record an electrostatic latent image on photoconductive belt 10 which corresponds to the informational areas contained within the document currently on platen 28. After imaging, the document is returned to the document tray via a simplex path when either a simplex copy or the first pass of a duplex copy is being made or via a duplex path when a duplex copy is being made.

The electrostatic latent image recorded on photoconductive belt 10 is developed at development station C by a magnetic brush developer unit 34 having three developer rolls 36, 38 and 40. A paddle wheel 42 picks up developer material and delivers it to the developer rolls 36, 38. Developer roll 40 is a cleanup roll while a magnetic roll 44 is provided to remove any carrier granules adhering to belt 10.

Following development, the developed image is transferred at transfer station D to a copy sheet. There, the photoconductive belt 10 is exposed to a pre-transfer light from a lamp (not shown) to reduce the attraction between photoconductive belt 10 and the toner powder image. Next, a corona generating device 46 charges the copy sheet to the proper magnitude and polarity so that the copy sheet is tacked to photoconductive belt 10 and the toner powder image attracted from the photoconductive belt to the copy sheet. After transfer, corona generator 48 charges the copy sheet to the opposite polarity to detach the copy sheet from belt 10.

Following transfer, a conveyor 50 advances the copy sheet bearing the transferred image to fusing station E where a fuser assembly, indicated generally by the reference numeral 52 permanently affixes the toner powder image to the copy sheet. Preferably, fuser assembly 52 includes a heated fuser roller 54 and a pressure roller 56 with the powder image on the copy sheet contacting fuser roller 54.

After fusing, the copy sheets are fed through a decurler 58 to remove any curl. Forwarding rollers 60 then advance the sheet via duplex turn roll 62 to gate 64 which guides the sheet to either finishing station F or to duplex tray 66, the latter providing an intermediate or buffer storage for those sheets that have been printed on one side and on which an image will be subsequently printed on the second, opposed side thereof. The sheets are stacked in duplex tray 66 face down on top of one another in the order in which they are copied.

To complete duplex copying, the simplex sheets in tray 66 are fed, in seriatim, by bottom feeder 68 back to transfer station D via conveyor 70 and rollers 72 for transfer of the second toner powder image to the opposed sides of the copy sheets. The duplex sheet is then fed through the same path as the simplex sheet to be advanced to finishing station F.

Copy sheets are supplied from a secondary tray 74 by sheet feeder 76 or from the auxiliary tray 78 by sheet feeder 80. Sheet feeders 76, 80 are friction retard feeders utilizing a feed belt and take-away rolls to advance successive copy sheets to transport 70 which advances the sheets to rolls 72 and then to transfer station D.

A high capacity feeder 82 is the primary source of copy sheets. Tray 84 of feeder 82, which is supported on an elevator 86 for up and down movement, has a vacuum feed belt 88 to feed successive uppermost sheets from the stack of sheets in tray 84 to a take away drive roll 90 and idler rolls 92. Rolls 90, 92 guide the sheet onto transport 93 which in cooperation with idler roll 95 and rolls 72 move the sheet to transfer station station D.

After transfer station D, photoconductive belt 10 passes beneath corona generating device 94 which charges any residual toner particles remaining on belt 10 to the proper polarity. Thereafter, a pre-charge erase lamp (not shown), located inside photoconductive belt 10, discharges the photoconductive belt in preparation for the next charging cycle. Residual particles are removed from belt 10 at cleaning station G by an electrically biased cleaner brush 96 and two de-toning rolls 98 and 100.

The various functions of machine are regulated by a controller which preferably comprises one or more programmable microprocessors. The controller provides a comparison count of the copy sheets, the number of documents being recirculated, the number of copy sheets selected by the operator, time delays, and jam corrections. Programming and operating control over machine is accomplished through the User Interface. Operating and control information is stored in a suitable memory and loaded into controller and job programming instructions are loaded into the controller through the User Interface. Conventional sheet path sensors or switches may be utilized to keep track of the position of the documents and the copy sheets. In addition, the controller regulates the various positions of the gates depending upon the mode of operation selected.

Figure 3:
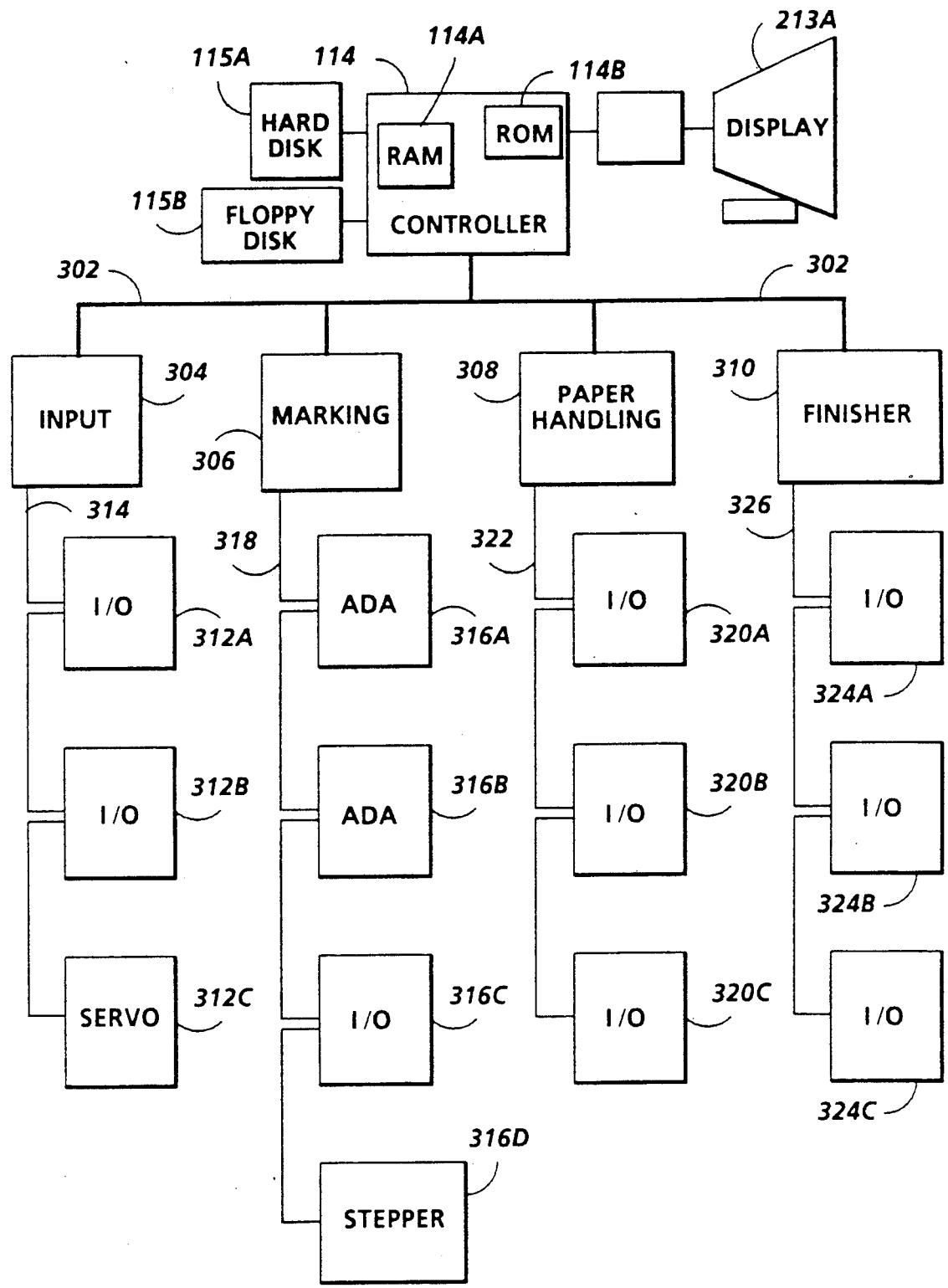
FIG. 3 is a block diagram of the operating control systems and memory for the machine shown in FIG. 1.

With reference to FIG. 3, the memory includes a hard or rigid disk drive 115A for receiving suitable rigid memory disks and a floppy disk drive 115B for receiving suitable floppy memory disks, both disk drives being electrically connected to Controller 114, the Controller 114 including RAM 114A and ROM 114B. In a preferred embodiment, the rigid disks are two platter, four head disks with a formatted storage capacity of approximately 20 megabytes. The floppy disks are 3.5 inch, dual sided micro disks with a formatted storage capacity of approximately 720 kilobytes. In normal machine operation, all of the control code and screen display information for the machine is loaded from the rigid disk at machine power up. Alternatively, all of the control code and screen display information for the machine can be loaded from a floppy disk at machine power up using the floppy disk drive built into the machine. Suitable display 213A is also connected to Controller 114 as well as a shared line system bus 302.

The shared line system bus 302 interconnects a plurality of core printed wiring boards including an input station board 304, a marking imaging board 306, a paper handling board 308, and a finisher/binder board 310. Each of the core printed wiring boards is connected to local input/output (I/O) devices through a local bus. For example, the input station board 304 is connected to digital input/output boards 312A and 312B and servo board 312C via local bus 314. The marking imaging board 306 is connected to analog/digital/analog boards 316A, 316B, digital input/output board 316C, and stepper control board 316D through local bus 318. In a similar manner, the paper handling board 308 connects digital input/output boards 320A, B and C to local bus 322, and finisher/binder board 310 connects digital input/output boards 324A, B and C to local bus 326. For further details of the control, reference may be had to U.S. Ser. No. 07/164,365 filed Mar. 4, 1988 and incorporated herein.

To load the control code from a floppy disk, the floppy disk is loaded into the floppy disk drive 115B. The memory allocation on a floppy disk loaded into the floppy disk drive 115B is a header sector or boot sector allocated to the location of that portion of the floppy disk that is initially read. A plurality of programs or code segments are also allocated on the floppy disk. The header sectors contain information concerning where to load the file in RAM 114A and at what page in memory to load, if it is booted.

An encrypted or keyed disk is a disk that has been encrypted or keyed in accordance with the present invention. There are three basic methods of using the Keyed Disk: (1) the application software requests that the user enters the password and then the software verifies that it matches the password on the Keyed Disk, (2) the Password is already encoded in the application software and the software verifies that a Keyed Disk is present. In this case the user does not know that the disk is a Keyed Disk, and (3) the Password is encoded in the application software and the software verifies that the proper Keyed Disk is present. The user is requested to enter the corresponding password, and this password is also checked against the actual password.

There are specific advantages to each of the methods. The first method requires that the user have physical possession of the Keyed Disk, and the application software which requires it, and that the user knows the password. In this case, the user does not really know that the disk is copy protected as the password could just be a match with a password in applications software. If the user knew the password and was able to use the original keyed disk, and then tried to copy it using a PC, it would be discovered that the password no longer worked. This then would indicate that some additional copy protection scheme was being used, but would not indicate how or where the password was located. In this situation, the application software does not know what the required password is, but simply requires a match between the entered password and the keyed password. This could allow the release of specifically keyed disks to specific people and the ability to track usage of the application software by which key was used to activate the software.

The second method of protection is more secretive. The user is still required to have physical possession of the Keyed Disk and the application software which requires its use. However, the user is not requested to enter a password, and does not know that the disk has a password or is copy protected. If a user attempts to copy the disk using normal disk copying methods, there would be no indication of failure and the user would return the original Keyed Disk without suspecting that there was something extra required to run the application. When the user actually tried to use the application, the system refuses to operate because the password is not on the disk that was copied.

The third method of protection is a combination of the first two methods. The user is required to have possession of a Keyed Disk with a specific password and is also required to know how to enter that password. The difference between this method and the first method is that a specific password and Keyed Disk is required for operation of the application software.

Method 1 allows anyone with a valid key disk (and corresponding password) to operate the application software, and method 2 hides the Keyed Disk protection mechanism from the unsuspecting user. Again, the Keyed tracks can not be copied with conventional hardware. Custom hardware must be built. Even when the custom hardware is built, custom software and the knowledge of which error codes to ignore must be utilized.

Figure 4:
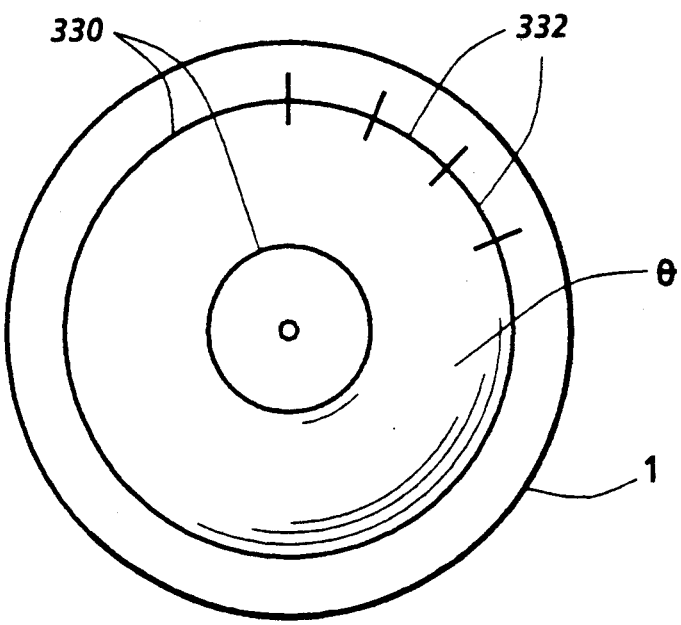
FIG. 4 is an illustration of a typical floppy disk track and sector layout.

With reference to FIG. 4, there is illustrated a typical floppy disk have a plurality of concentrically disposed, individually addressed tracks 330 on either side of the disk. Typically, there are 80 tracks or rings disposed on the floppy disk and numbered 0–79 with the 0 track being the outer most ring on the floppy disk and track 79 being the inner most track or ring on the disk. Two (not shown) reading heads are located with respect to the floppy disk to read the information contained thereon, the top head being disposed to read the information from the top of the floppy disk is designated head 0 and the bottom head disposed to read the information from the bottom of the disk is designated head 1. Each of the tracks is segmented into a plurality of sectors 332 as shown in FIG. 4, each of the sectors also being individually addressed to read the information contained thereon.

Figure 5:
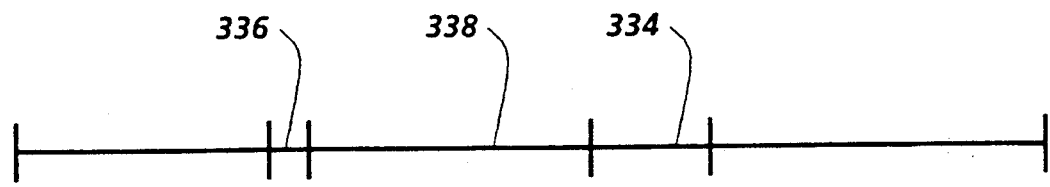
FIG. 5 is an illustration of a floppy disk sector in accordance with the present invention.

In accordance with the present invention, with reference to FIG. 5, there is illustrated an encrypted password 334 is placed on one or more tracks of the floppy disk that are not routinely accessible. When the disk is executed, a decoder reads the data on the normally inaccessible track and decodes the track. The system then locates the password 334 in a specific location on the track, the password data being different from the other data in the track and compares it to a verification or default password.

In a typical embodiment, the track #80, the inner most ring of the disc is normally inaccessible. Upon this track is data that would contain the stored and encoded password 334 as illustrated in FIG. 5. The remaining data of the track would be arbitrary and random except for one consistent pattern, known as the index pattern as illustrated. The decoder locates the index pattern 336 and then adds an offset 338 to properly locate the encoded password as illustrated. Having located the password, the password would then be unencrypted to compare with the default password. A different password or portions of one password could be located in a sector on track #80 on both the top and the bottom of the disk, thus requiring the track 80 to be read from both the top and the bottom to locate to the password for deencryption and comparison to the default password. It should also be noted that the scope of the invention is intended to include variable length passwords as well as multiple passwords on the same disk as well as multiple user entered passwords and multiple default passwords at the same time. The default password could be a password already located on the disk or in fact entered by a user through the control console.

In accordance with another feature of the present invention, additional protection is provided by writing the data to the normally unaccessible tracks in a nonstandard format and in non standard length. In other words the usual format for the tracks and sectors could be altered and the length of the various segments of the sector could also be altered. In such a system, the typical floppy disk drive recognizing non standard formats would ordinarily provide an error signal. In accordance with the present invention, the error signal would simply be ignored and the system would proceed to read the unaccessible track looking for the index pattern to locate the encrypted password. Even if an attempt was made to illicitly copy the floppy disk and read the contents by ignoring the error signal, since the encrypted password is not always located at the same position within the data that is read, it would be impossible to locate the password without being able to locate the initial pattern or index pattern to provide the relative starting position. Once the starting position is determined, the offset must be known to properly locate the encrypted password. Finally, even if the password is located, the special unencryption procedure must be know to unencrypt the password.

Figure 6:
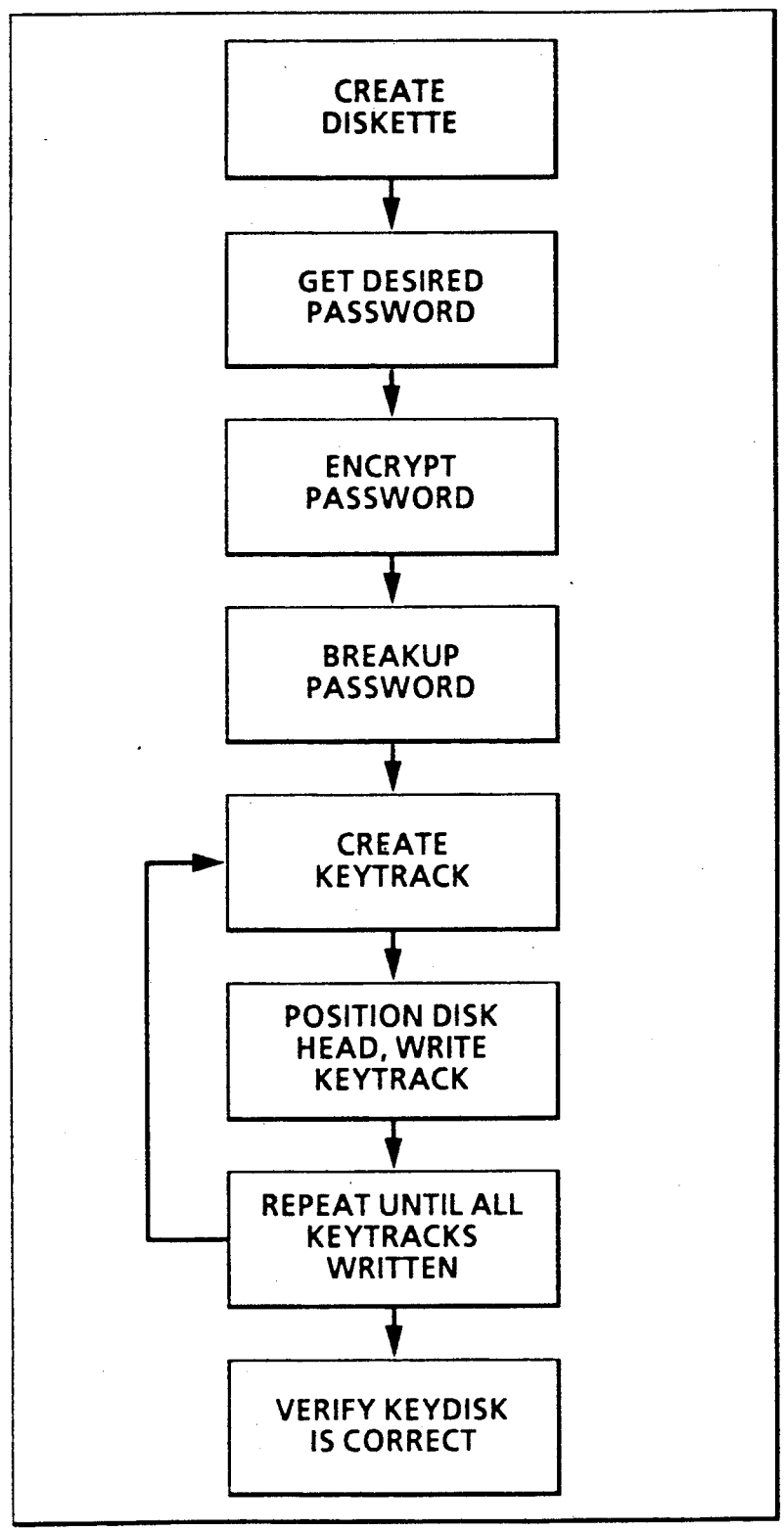
FIG. 6 is a flow chart illustrating the creation of a KeyDisk floppy in accordance with the present invention.

With reference to FIG. 6, there is illustrated the technique for creating a keyed disk in accordance with the present invention. The first step is to format and prepare this disk in a normal method. The next step is to obtain a KeyDisk Password and encrypt the password. It should be understood that various coding and encryption techniques are contemplated within this step. It would definitely also be advantageous to break the encrypted password into a several partial passwords at this point.

The next step is to create the keytrack using a partial password and uncopyable key track format and then position the floppy heads on the desired location and write key track. Then, create the keytrack and the position the floppy heads steps are repeated until all portions of the partial password are encoded onto the disk. Finally, there is a verification that the encrypted password on the floppy is readable, decodable, and correct.

Figure 7:
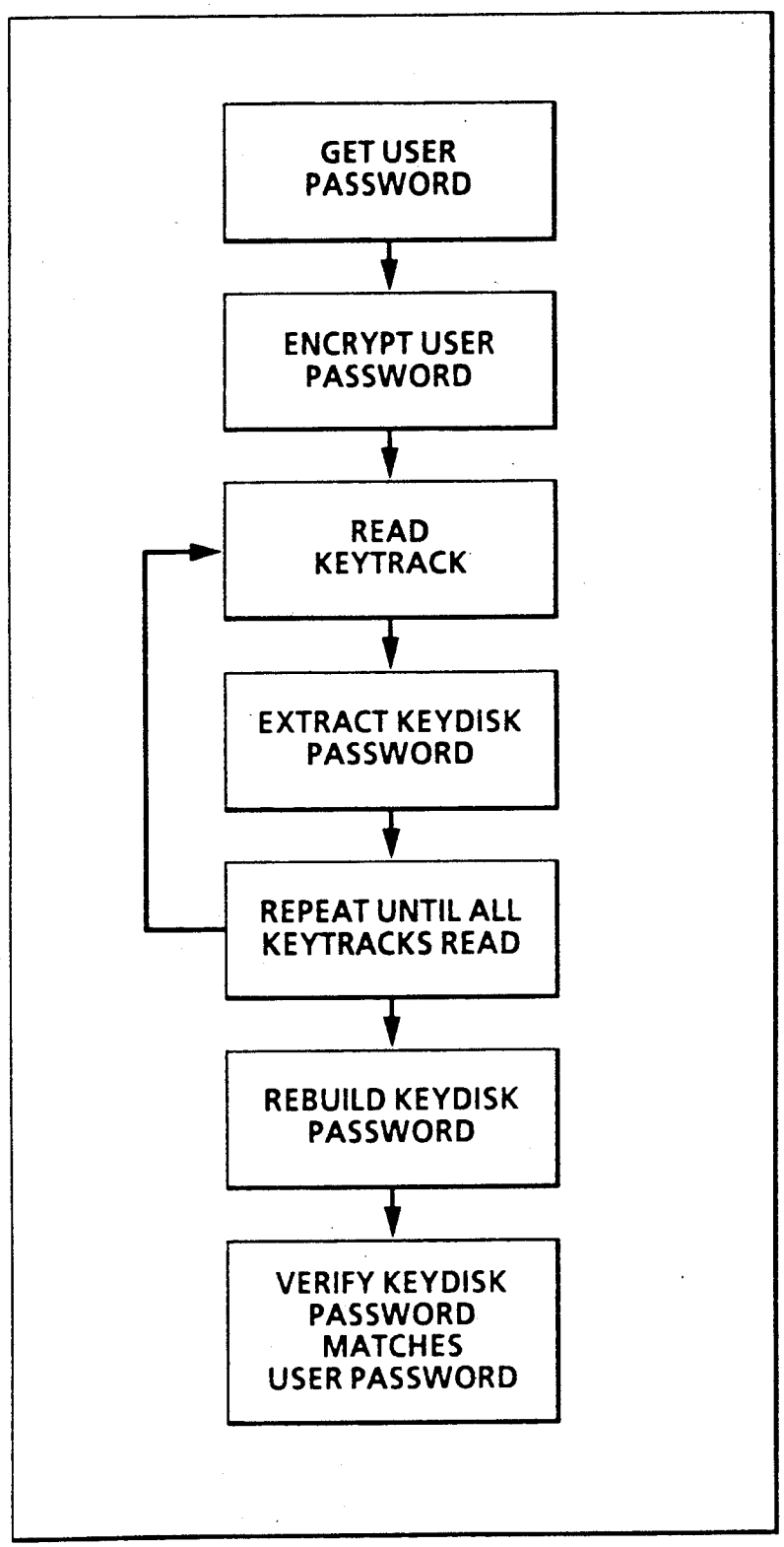
FIG. 7 is a flow chart illustrating the verification of a KeyDisk floppy in accordance with the present invention.

With reference to FIG. 7, there is illustrated a preferred technique for verifying a keyed disk. The first step is to get he KeyDisk Password and the next step is to encrypt the password. Then, the floppy heads are positioned on the desired location to read the keytrack. Once the floppy heads are positioned, the process of extracting the encrypted password or part of the encrypted password from the keytrack begins.

If the system is unable to locate the encrypted password or the keytrack at the desired location, then the test fails. It is then necessary to repeat the read keytrack and extract key disk password steps until all portions of the password are extracted from the disk. The extracted portions of password are combnined into a single password. Then the extracted password with encrypted entered password are compared. Finally, if the extracted password does not match the encrypted password, then the test fails.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

We claim:

1. In a control system for an image processing apparatus including a main memory and a floppy disk drive, the method of inhibiting the execution of a floppy disk loaded into the floppy disk drive, the floppy disk having a predetermined key track, the key track including random data unrecognizable to the control but including an arbitrarily positioned index pattern and a password related to the index pattern, comprising the steps of:

transferring the contents of the key track from the floppy disk to the main memory, recognizing an error signal manifesting the unrecognizable random data, ignoring the error signal and scanning the random data to find the arbitrarily positioned index pattern, locating the password related to the index pattern among the random data, and comparing the password to a second password stored in the main memory to be able to execute the instructions stored on the floppy disk.

2. The method of claim 1 wherein the control includes a user interface and the second password is loaded into the control via the user interface.

3. The method of claim 1 wherein the the key track is the innermost track of the disk.

4. The method of claim 1 wherein the step of comparing the password to a second password stored in the main memory to be able to execute the instructions stored on the floppy disk includes the step of deencrypting the password.

5. The method of claim 1 wherein the step of locating the password related to the index pattern among the random data includes the step of reading the key track on both sides of the floppy disk.

6. In a control system for an image processing apparatus including a main memory and a disk drive, the method of permitting the execution of a disk loaded into the disk drive, the disk having a plurality of tracks, comprising the steps of:

placing a data file including arbitrary data and a password on a normally unaccessible track of the disk, reading the data file from the normally unaccessible track of the disk and storing in main memory, decoding the password and comparing the password to a default password, and upon a permissible comparison of the password with the default password, permitting execution of the disk.

7. The method of claim 6 wherein the default password is located on said disk.

8. The method of claim 6 wherein the control system includes a user interface and the default password is manually entered via the user interface.

9. The method of claim 6 wherein the step of decoding the password includes the step of de-encrypting the password.

10. The method of claim 6 including the step of using a plurality of passwords.

11. The method of claim 6 including the step of using a plurality of default passwords.

12. In a control system for an image processing apparatus including a main memory and a disk drive, the method of permitting the execution of a disk loaded into the disk drive, the disk having a plurality of tracks, comprising the steps of:

writing data in non-standard format and length to a normally unaccessible track of the disk, the data including an encrypted password, the password being located at an arbitrary location within the data, reading the data resulting in an error signal, locating a starting position and applying an offset to identify the password, and unencrypting and authenticating the password in order to execute the disk.

13. The method of claim 12 including the step of reading unaccessible tracks on both sides of the disk.

14. The method of claim 12 including the step of ignoring the error signal and scanning the track for said starting position.

* * * * *